United States Patent Office 3,562,259
Patented Feb. 9, 1971

3,562,259
7 - METHYL - 1,2 - METHYLENE - 4 - CHLORO STEROIDS AND PROCESS FOR THE PRODUCTION THEREOF
Helmut Hofmeister, Hermann Steinbeck, and Rudolf Wiechert, Berlin, Germany, assignors to Schering AG, Berlin and Bergkamen, Germany
No Drawing. Filed Dec. 3, 1968, Ser. No. 780,872
Claims priority, application Germany, Dec. 7, 1967, P 16 43 054.9
Int. Cl. C07c 169/18
U.S. Cl. 260—239.55
30 Claims

ABSTRACT OF THE DISCLOSURE

4 - chloro - 7 - beta-methyl-1-alpha,2-alpha-methylene-4-pregnene or androstene-3-one compounds which may also be substituted by hydroxy or oxy in the 11-position and may have various substituents in the 17-position including also the corresponding delta$^{4,6}$-7-methyl compounds. The compounds are useful for treatment of gynecological complaints.

The compounds are made by reacting a corresponding steroid which is 6-beta, 7-beta-methylene substituted with a halogen acid followed by reduction to remove the halogen from the 7-beta-halogen-methyl group and followed further if desired by dehydrogenation to form a 6–7 double bond.

BACKGROUND OF THE INVENTION

1 - alpha,2 - alpha-methylene-4-ene-3-keto steroids have been described in the literature. However, reaction of these compounds with a halogen acid was found to result in breaking up of the cyclopropane ring and conversion to the 1-alpha-halogeno methyl compounds. 6-alpha,7-alpha-epoxy-1-alpha,2-alpra-methylene compounds have likewise been treated with hydrogen. However, in this case the cyclopropane ring was split off together with the 6-alpha,7-alpha-epoxy rings (German Patents 1,122,944 and 1,158,966).

1,2-alpha-methylen-7-beta-methyl steroids of the general configuration outlined below have not been known heretofore. This applies also to the 7-methyl steroids which are delta$^6$-unsaturated.

SUMMARY OF THE INVENTION

Compounds of the formula

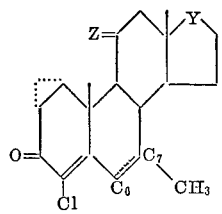

wherein Y is

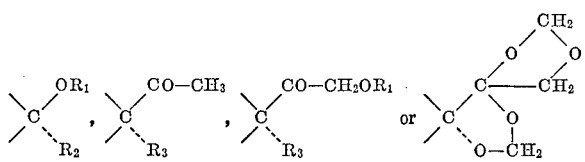

Z is hydrogen or oxygen or the grouping HOH,
$R_1$ is hydrogen or an acid residue,
$R_2$ is hydrogen or lower saturated or unsaturated alkyl,
$R_3$ is hydrogen or hydroxy or a functionally modified hydroxy group, and $$C_6\text{===}C_7$$

is a saturated or unsaturated carbon-carbon bond, the 7-methyl group being beta-oriented if $$C_7\text{===}C_7$$

is a saturated carbon-carbon bond. The invention also embraces a process for making the just-defined compounds. The process comprises the steps of bringing a steroid of the formula

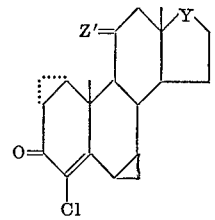

wherein Y has the same meaning as above and Z' is hydrogen or oxygen, into reaction with a halogen acid of the formula HX wherein X is chlorine, bromine or iodine; followed by reducing the 7-beta-halogeno methyl compound to convert the halogeno methyl group into a methyl group.

DESCRIPTION OF THE PREFERRED EMBODIMENTS

In the embodiments of the compounds defined in the above summary, the acid residue in $R_1$ may be derived from any type of acid as they are customarily used in steroid cremistry for esterifications. The preferred esters are organic carboxylic acids having up to 15 carbon atoms, particularly low and intermediate aliphatic carboxylic acids. The acids can also be unsaturated, branched or polycarboxylic acids or they may be substituted in conventional manner for instance by hydroxyl or amino groups or halogen atoms. Suitable are also cycloaliphatic, aromatic and mixed aromatic-aliphatic and heterocyclic acids which likewise can be substituted in conventional manner.

Examples of preferred acids are, for instance, the following: acetic acid, propionic acid, caproic acid, enanthic acid, undecylic acid, oleic acid, trimethylacetic acid, dichloroacetic acid, cyclopentylpropionic acid, phenyl propionic acid, phenylacetic acid, phenoxyacetic acid, dialkylamino acetic acid, piperidino acetic acid, succinic acid, benzoic acid, etc. For the making of water-soluble compositions, esters of inorganic acids may be used such as those of sulfuric and phosphoric acid.

Regarding the saturated or unsaturated lower alkyl in $R_2$, preferred groups are the methyl, ethyl, ethinyl and vinyl groups.

The 7-methyl steroids of the invention have in themselves valuable therapeutic properties. They are also valuable as intermediates for making other therapeutically effective compounds. The compounds of the invention belonging in the androstene series are distinguished for instance by a strong inhibitory action on the hypophysis and are therefore suited for treatment of climacteric complaints. Of particular interest is the surprisingly strong progestational action of the new pregnene derivatives which are superior in their effectiveness to known progestational compositions. The following table illustrates the superiority of the compounds of the invention using as an example the 4-chloro-17-acetoxy - 7 - beta-methyl-1-alpha, 2 - alpha - methylene - 4 - pregnene-3,20-dione (I) and the 4-chloro-17-acetoxy-7-methyl-1-alpha,2-alphamethylene - 4,6 - pregnadiene - 3,20 - dione (II) and, as comparisons, well known progestational compounds such as at III–V. The test results were obtained in the conventional Clauberg Test by means of oral application and using infantile rabbits. The table lists the minimum amount (limit value) necessary to obtain a positive result.

TABLE (I) 4-chloro -17 - acetoxy - 7 - beta-methyl-1-alpha 2 - alpha - methylene-4-pregnene-3, 20-dione _____ 3

(II) 4-chloro - 17 - acetoxy - 7 - methyl-1-alpha, 2-alpha - methylene - 4,6 - pregnadiene-3, 20-dione _____ 3

(III) 17-acetoxy - 6 - alpha - methyl - 4 - pregnene-3,20-dione _____ 100

(IV) 6-chloro - 17 - acetoxy - 4,6 - pregnadiene-3, 20-dione _____ 30

(V) 17-beta - hydroxy - 17 - alpha-ethinyl-4-estrene-3-one _____ 130

In practical use, for instance in connection with progestational therapy, the compounds of the invention may be combined with the usual carrier materials as employed in Galenic pharmacy and they may be applied in the customary physical forms such as tablets, lozenges, capsules and injection solutions. The dosis depends on the seriousness of the individual case. Generally, a dose will be used between 1 and 100 mg. of effective compound per day.

A process for making the compounds of the invention is as follows: Steroids of the formula

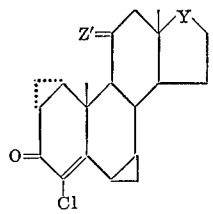

II wherein Y has the meaning above given and Z' is hydrogen or oxygen are brought into reaction with a halogen acid of the type HX, wherein X is chlorine, bromine or, preferably, is iodine. There is thus obtained a 7-beta-halogeno methyl compound. This compound is then subjected to reduction to remove the halogen atom. If desired, the reduction reaction may then be followed by saponification of esterified hydroxyl groups that may be present in the molecule or a bismethylenedioxy side-chain blocking may be split off. Likewise, any free hydroxyl groups that may be present may be esterified. It is furthermore possible to introduce a double bond into the 6,7-position. If desired, an 11-keto group which may be present may be subjected to reduction, if necessary after temporary blocking of the 3- and 20-keto groups. The reaction with the halogen acid HX to act upon the 1-alpha, 2-alpha; 6-beta, 7-beta-dimethylene steroid is carried out in conventional manner by adding the halogen acid to a solution of the steroid. As solvents, those may be used which are inert, both against the steroid and the halogen acid. Inert solvents are for instance ethers, tetrahydrofuran and dioxane, hydrocarbons such as hexane and benzene, chlorinated hydrocarbons, such as methylene chloride and chloroform, and carboxylic acids, such as acetic acid and formic acid. The halogen acid can also be formed in situ during the reaction from reacting an alkali salt with during the reaction from reacting an alkali salt with a lower carboxylic acid such as formic acid.

The reaction proceeds at temperatures between about 0 and 50° C., preferably at between 20 and 30° C., at which temperatures the optimum yield is obtained. If higher temperatures are used, secondary reactions will develop.

As indicated before, it is surprising that in the reaction with the halogen acid, only the 6-beta,7-beta-methylene group is split open while the 1-alpha,2-alpha-methylene group is not attacked, as would be expected from the reaction previously discussed and disclosed in German Patent 1,122,944. The type of reaction actually occurring in the present invention was therefore entirely unexpected. This follows also from the type of reaction occurring according to German Patent 1,158,966 with 6-alpha,7-alpha-epoxide compounds where both the epoxide group and the 1,2-methylene group is opened up.

In addition to the highly selective opening of the rings the reaction is also characterized by a high stereo-specifity. If, for instance, a 7-methyl group is introduced into the 4,6-diene-3-keto system by means of methylmagnesium halide, a mixture of isomers of the 7-alpha- and 7-beta-methyl compounds is obtained. In contrast, in the reaction of the invention, where the halogen acid acts upon the 6-beta,7-beta-methylene group, only a 7-beta-halogeno methyl component results.

The removal of the halogen atom from the halogeno methyl position at 7-beta is carried out by reduction as previously indicated. The reduction may be effected in conventional manner. In order to avoid a simultaneous reduction of the 1-alpha,2-alpha-methylene ring and of the delta$^4$-unsaturated 3-keto system, it is advisable to use mild conditions. The reaction preferably is therefore carried out with Raney-nickel as catalyst at a temperature between about 10 and 80° C.

The esterification or saponification of the free hydroxyl groups or ester groups in the 17- or 21-position is carried out in conventional manner. Likewise, a bismethylene dioxide side-chain blocking group can be removed hydrolytically.

It is possible subsequently to introduce a delta$^6$-double bond. For this purpose, for instance, dehydrogenating agents may be used such as chloranil or 2,3-dichloro-5,6-dicyanbenzoquinone.

The delta$^6$-double bond can also be introduced under less severe conditions by first subjecting the 7-beta-methyl-4-ene-3-ketone to reaction with N-bromosuccinimide in allyl position and then splitting off hydrogen bromide by reaction with lithium halide and alkali carbonate in dimethylformamide from the isolated 6-bromo compound.

If desired, a partial reduction may also be effected of an 11-positioned keto group. The reaction is preferably carried out with lithium-tri-tert.-butoxy-aluminumhydride since stronger reducing agents such as lithium aluminumhydride will attack also the keto groups in the 3- and 20-positions. It is preferred, however, even when using the lithium-tri-tert.-butoxy-aluminumhydride for the reduction, to employ a protection for the 20-keto group. For instance, in the cortisone series of compounds, it is preferred to block the side chain with a protective substituent e.g. a bismethylene dioxy group. If stronger reducing agents are used, it is necessary also to protect the 3-keto group, for instance by introducing a ketal group. After reduction has been effected, this group can then be re-oxidized.

The following examples will illustrate the making of the starting products later used for the reactions in making the compounds of the invention:

Example A.—4-chloro-17-acetoxy-1-alpha,2-alpha;6-beta, 7-beta-dimethylene-4-pregnene-3,20-dione 6 g. of 4-chloro-17-acetoxy-1,4,6-pregnatriene-3,20-dione are reacted with an ethereal solution of diazomethane. This solution is obtained from 16 g. of nitrosomethylurea, 440 ml. ether and 320 ml. of a 40% potassium hydroxide. The mixture with the diazomethane solution is permitted to stand for 7 days in a closed vessel at room temperature. The excess solvent is then removed in a vacuum. There remains as residue a bis-pyrazoline compound which is dissolved in 240 ml. of acetone and is reacted with 12 ml. of a 70% perchloric acid which is added dropwise upon stirring. After evolution of gas, 10 times the amount of ice water is added by stirring whereupon the precipitate is formed is removed by filtration and then taken up in methylene chloride followed by washing with water and drying over sodium sulfate. After concentration to dryness, the residue is subjected to chromatography through silica gel. After recrystallization from acetic acid ester, there are obtained 1.2 g. of 4-chloro-17-acetoxy-1-alpha, 2-alpha;6-beta,7-beta - dimethylene-4-pregnene-3,20-dione; M.P. 278 to 279° C.

Example B.—4-chloro-17-beta-acetoxy - 1 - alpha,2-alpha; 6-beta,7-beta-dimethylene-4-androstene-3-one 1.5 g. of 4-chloro-17-beta-acetoxy-1,4,6-androstatriene-3-one are reacted with an ethereal diazomethane solution which is formed from 15 g. nitrosomethylurea, 110 ml. ether and 80 ml. of a 40% potassium hydroxide. The mixture is permitted to stand for 7 days in a closed vessel at room temperature. The excess solvent is then carefully removed in vacuum. There remains a bispyrazoline compound as desidue which is dissolved in 60 ml. acetone and reacted with 3 ml. of a 70% perchloric acid which is added dropwise upon stirring. After gas development has set in, ice water is added by stirring in an amount 10 times the original amount of solution. The precipitate that forms is then filtered off, taken up in methylene chloride, washed with water and dried over sodium sulfate. After concentration to dryness, the residue is subjected to chromatography through silica gel. There are obtained 350 mg. of 4-chloro-17-beta-acetoxy-1-alpha,2-alpha;6-beta,7-beta-dimethylene-4-androstene-3-one; M.P. 181.5 to 182° C. After recrystallization from isopropyl ether, the melting point rises to 191.5 to 193° C.

$$UV: \epsilon_{272} = 11.800$$

Example C.—4-chloro-17,20;20,21 - bismethylenedioxy-1-alpha,2-alpha;6-beta,7 - beta - dimethylene-4-pregnene-3, 11-dione 3.2 g. of 17,20;20,21-bismethylenedioxy-1,4,6-pregnatriene-3,11-dione was dissolved in 50 ml. of dimethylformamide. To this solution a solution of 565 mg. of chlorine in 10.5 ml. propionic acid are slowly added upon stirring at a temperature of −30° C. during a period of 10 minutes. The reaction mixture is then permitted to stand for 2 hours at −30° C. and subsequently, ice water is added. The formed precipitate is extracted with methylenechloride, the extract is successively washed with sodium thiosulfate, a sodium bicarbonate solution and water and is then dried over sodium sulfate. After crystallization of the crude product from acetic acid ester, there are obtained 1.3 g. of 4-chloro-17,20;20,21-bismethylenedioxy-1,4,6-pregnatriene-3,11-dione; M.P. 247 to 249° C. (decomposition).

1.3 g. of 4-chloro-17,20;20,21-bismethylenedioxy-1,4,6-pregnatriene-3,11-dione are dissolved in 6 ml. of methylene chloride. A solution is separately prepared of 1.3 g. trimethyloxosulfoniumiodide and 290 mg. of sodium hydride (as a 50% oil suspension) in 17 ml. of dimethylsulfoxide. The solution of the steroid is then added to the sulfonium iodide solution at room temperature upon stirring and while introducing nitrogen. The reaction is continued under the same conditions and while stirring for another 2 hours. The dark-colored reaction solution is then poured into acetic acid ice water, extracted with methylene chloride, whereupon the methylene chloride solution is washed with a sodium bicarbonate solution and water, is dried over sodium sulfate and is concentrated by evaporation. The crude product is subjected to chromatography through silica gel. Elution is effected with pentane 11% acetone. There are thus obtained 396 mg. of 4-chloro-17,20;20,21-bismethylenedioxy-1-alpha, 2-alpha; 6-beta,7-beta-dimethylene-4-pregnene-3,11-dione which after recrystallization from hexane/acetone has a melting point of 276–277° C.

$$UV: \epsilon_{271} = 9.140$$

Using these starting products, the following examples will illustrate the making of the compounds of the invention.

Example 1

3.0 g. of 4-chloro-17-acetoxy-1-alpha, 2-alpha; 6-beta, 7-beta-dimethylene-4-pregnene-3,20-dione (made in accordance with above Example A) are stirred in 75 ml. formic acid with 15 g. potassium iodide at 30° C. for 7 hours. After precipitation in ice water, the precipitate is removed by suction, taken up in methylene chloride and the methylene chloride phase is then washed with a solution of sodium thiosulfate and water. After drying over sodium sulfate and concentration to dryness by evaporation, one obtained a crude 4-chloro-17-acetoxy-7-beta-iodo-methyl-1-alpha, 2-alpha-methylene-4-pregnene-3,20-dione. (A specimen after purification had the melting point between 211 and 212° C.; $UV: \epsilon_{255} = 12.600$.) The crude product was stirred in 180 ml. methanol for four hours at room temperature in the presence of 10 g. Raney-nickel catalyst. The product was subsequently filtered off the Raney-nickel catalyst and the filtrate was concentrated in vacuum to dryness. The residue thus obtained was taken up in methylene chloride, washed with water, dried over sodium sulfate, and concentrated to dryness. After chromatography through silica gel and recrystallization from isopropyl ether, 2.3 g. of 4-chloro-17-acetoxy-7-beta-methyl - 1-alpha,2-alpha-methylene-4-pregnene-3,20-dione, with a melting point of 236 to 237° C. were obtained.

$$UV: \epsilon_{256} = 11.100$$

Example 2

713 mg. of 4-chloro-17-acetoxy-7-beta-methyl-1-alpha,2-alpha-methylene-4-pregnene-3,20-dione were heated upon refluxing for a period of 70 minutes in 33 ml. of absolute carbontetrachloride with 325 mg. N-bromosuccinimide and 50 mg. dibenzoylperoxide. The reaction mixture was then diluted with methylene chloride, washed with water and dried over sodium sulfate. After concentration to dryness, the crude bromo composition was heated in 15 ml. dimethylformamide with 385 mg. lithium carbonate and 450 mg. lithium bromide upon stirring for 5 hours to 115° C. and employing a nitrogen atmosphere. The reaction mixture was then diluted with ether, washed with dilute sulfuric acid and water, dried over sodium sulfate and concentrated to dryness in a vacuum. The residue was subjected to chromatography through silica gel and, after recrystallization from isopropyl ether, there were obtained 510 mg. of 4-chloro-17-acetoxy-7-methyl-1-alpha,2-alpha-methylene - 4,6 - pregnadiene-3,20-dione; M.P. 213 to 214.5° C.

Example 3

200 mg. of 4-chloro-17-acetoxy-7-methyl-1-alpha,2-alpha-methylene-4,6-pregnadiene-3,20-dione are stirred in 30 ml. methanol with 3.2 ml. 1 N-sodium hydroxide at room temperature for a period of 17 hours. The solution is subsequently neutralized with acetic acid and substantially concentrated in a vacuum. The precipitate after precipitation in ice water is removed by suction, washed neutral and dried. After recrystallization from isopropyl ether, 110 mg. of 4-chloro-17-hydroxy-7-methyl-1-alpha,2-alpha-methylene-4,6-pregnadiene-3,20-dione are obtained; M.P. 224.5–226.5° C. $UV: \epsilon_{308} = 19.100$.

Example 4

100 mg. of 4-chloro-17-hydroxy-7-methyl-1-alpha,2-alpha-methylene-4,6-pregnadiene-3,20-dione are permitted to stand for 3 days at room temperature dissolved in 3 ml. caproic acid anhydride with 50 mg. p-toluene sulfonic acid. The mixture is then reacted with a small amount of pyridine and subsequently distilled in a stream of water vapor. The aqueous phase is then extracted with ether and the ether phase is dried over sodium sulfate and concentrated to dryness in a vacuum. After purification through thin-layer chromatography, there are obtained 85 mg. of 4 - chloro-17-hexanoyloxy-7-methyl-1-alpha,2-alpha-methlyene-4,6-pregnadiene-3,20-dione in the form of oil. UV: $\epsilon_{307}$=17.900.

Example 5

3.9 g. of 4-chloro-17-beta-acetoxy-1-alpha,2-alpha; 6-beta, 7-beta-dimethylene-4-androstene-3-one (made as described in Example B) are stirred in 70 ml. concentrated formic acid with 15 g. potassium iodide at a temperature of 30° C. for a period of 3 hours and while introducing nitrogen. The reaction mixture is then precipitated in ice water, removed by suction and taken up in methylene chloride. The methylene chloride phase is washed with sodium thiosulfate in solution and water and is dried over sodium sulfate. After removing the solvent by distillation and after recrystallization from hexane/acetone, there are obtained 4.25 g. of 4-chloro-17-beta-acetoxy-7-beta-iodomethyl - 1 - alpha,2-alpha-methylene-4-androstene-3-one; M.P. 99–101° C. UV: $\epsilon_{256}$=12.200.

6.2 g. of 4-chloro-17-beta-acetoxy-7-beta-iodomethyl-1-alpha,2-alpha-methylene-4-androstene-3-one are stirred at room temperature for a period of 3 hours in 600 ml. ethanol with 18 g. Raney-nickel in a nitrogen atmosphere. After removal of the Raney-nickel, the filtrate is subjected to concentration by evaporation. The reaction product is taken up in methylene chloride, washed with water, dried and subjected to chromatography through silica gel. It is then subjected to elution with 42–50% ether/pentane. There are obtained 3.1 g. of 4-chloro-17-beta-acetoxy-7 - beta - methyl-1-alpha,2-alpha-methylene-4-androstene-3-one; M.P. 207–208° C. UV: $\epsilon_{256}$=11.300.

Example 6

500 mg. of 4 - chloro-17-beta-acetoxy-7-beta-methyl-alpha,1-alpha,2 - alpha-methylene-4-androstene-3-one are stirred in 25 ml. methanol with 3 ml. 1 N-sodium hydroxide for a period of 10 hours at room temperature. The solution after neutralization with acetic acid is then substantially concentrated in a vacuum and taken up in methylene chloride. The methylene chloride phase is washed with a sodium bicarbonate solution and water until neutral and then dried. After chromatography through silica gel, there are obtained 340 mg. of 4-chloro-17-beta-hydroxy-7-beta-methyl-1-alpha,2-alpha - methylene-4-androstene-3-one in the form of an oily product. UV: $\epsilon_{256}$=10.400.

Example 7

14 g. of 4 - chloro-17-beta-acetoxy-7-beta-methyl-1-alpha,2 - alpha-methylene-4-androstene-3-one are heated upon reflux in 740 ml. absolute carbontetrachloride with 7 g. N-bromosuccinimide and 1.4 g. dibenzoylperoxide until the bromination reaction sets in. The reaction solution is then successively washed with water, sodium thiosulfate in solution and again water, and is dried over sodium sulfate. After removal of the solvent by distillation, the 6-bromo composition which is a dark-red oil is dissolved in 170 ml. dimethylformamide in order to split off hydrogen bromide and is stirred for 5 hours from introduction of nitrogen at a temperature of 115° C. with 3.6 g. of lithium bromide and 7.6 g. of lithium carbonate. The reaction product is then filtered and stirred into ice water. The further treatment is effected as described in Example 2. The crude product is subjected to chromatography with 7–12% acetone/pentane through silica gel. There are obtained 12.2 g. of 4-chloro-17-beta-acetoxy - 7 - methyl-1-alpha,2-alpha-methylene-4,6-androstadiene-3-one; M.P. 213–214° C. (hexane/acetone). UV: $\epsilon_{217}$=6.080; $\epsilon_{307}$=20.800.

Example 8

1.6 g. of 4 - chloro-17,20;20,21-bismethylenedioxy-1-alpha,2-alpha;6-beta,7-beta-dimethylene - 4 - pregnene-3, 11-dione (made as described in Example C) are stirred for 20 hours at 30° C. in a nitrogen atmosphere in 33 ml. concentrated formic acid with 6.4 g. potassium iodide. After further treatment as described in Example 5, there was obtained a crude product of 2.5 g. of 4-chloro-17,20; 20,21-bismethylene - dioxy - 7 - beta-iodomethyl-1-alpha, 2 - alpha - methylene-4-pregnene-3,11-dione. A purified specimen of this product had a melting point of 180–203° C. (upon decomposition); UV: $\epsilon_{253}$=12.300. The crude product was stirred in 210 ml. ethanol at room temperature for a period of 20 hours over 6.4 g. Raney-nickel in order to remove the iodine atom. The further treatment was effected as described in Example 5.

The crude product was then subjected to chromatography through silica gel with 8–10% acetone/pentane. After recrystallization from acetic acid ester, there were obtained 234 mg. of 4-chloro - 17,20;20,21-bismethylenedioxy - 7 - beta - methyl - 1 - alpha,2-alpha-methylene-4-pregnene-3,11-dione; M.P. 219–221% C. (decomposition). UV: $\epsilon_{256}$=11.700.

Example 9

1.1 g. of 4 - chloro - 17,20; 20,21-bismethylenedioxy-7-beta - methyl - 1 - alpha,2-alpha-methylene-4-pregnene-3,11-dione are stirred for 1½ hours at 100° C. in 50 ml. concentrated formic acid in order to split off the bismethylenedioxy group. The reaction product is precipitated in ice water. The precipitate is removed by suction, taken up in methylene chloride, washed with a sodium bicarbonate solution and water, and finally dried. The crude 4 - chloro - 17 - hydroxy-21-formyloxy-7-beta-methyl-1-alpha,2 - alpha - methylene-4-pregnene-3,11,20-trione is stirred for 1½ hours at 0° C. in 9 ml. methylene chloride and 10 ml. methanol with 64 mg. potassium hydroxide in order to effect the saponification. The solution is then neutralized with acetic acid and is substantially concentrated in a vacuum by evaporation. The reaction product, after precipitation in ice water, is removed by suction, taken up in methylene chloride, washed with water and dried. After chromatography through silica gel with acetone/pentane, there are obtained 430 mg. of 4-chloro-17,21 - dihydroxy-7-beta - methyl-1-alpha,2-alpha-methylene-4-pregnene-3,11,20-trione in the form of an oil. UV: $\epsilon_{256}$=10.600.

Example 10

900 mg. of 4 - chloro - 17,21 - dihydroxy-7-beta-methyl - 1 - alpha,2 - alpha-methylene-4-pregnene-3,11, 20-trione are acetylated at room temperature in 3.6 ml. pyridine with 1.8 ml. acetic acid anhydride. The reaction mixture is stirred into ice water after 10 hours. The precipitate is removed by suction, taken up in methylene chloride and the methylene chloride phase is washed with water and dried. After chromatography through silica gel with pentane/acetone and recrystallization from acetic acid ester, there are obtained 460 mg. of 4-chloro-17-hydroxy - 21 - acetoxy - 7 - beta-methyl-1-alpha,2-alpha-methylene - 4 - pregnene - 3,11,20-trione; M.P. 253–256° C. (decomposition). UV: $\epsilon_{256}$=10.900.

Example 11

700 mg. of 4-choro-17-acetoxy-7-beta-methyl-1-alpha, 2-alpha-methylene-4-pregnene-3,20-dione are stirred at room temperature for a period of 16 hours in a nitrogen atmosphere in 70 ml. methanol with 11.2 ml. 1 N-sodium hydroxide. The further treatment is effected as described in Example 3.

After recrystallization from isopropyl ether/methylene chloride, there are obtained 405 mg. of 4-chloro-17-hydroxy-7-beta-methyl-1-alpha,2-alpha-methylene - 4 - pregnene-3,20-dione; M.P. 219–221.5° C. UV: $\epsilon_{256}$=11.300.

Example 12

100 mg. 4-chloro-17-hydroxy-7-beta-methyl-1-alpha,2-alpha-methylene-4-pregnene-3,20-dione are reacted as described in Example 4 with caproic acid anhydride and p-toluene sulfonic acid and subjected to further treatment. After purification by means of thin-layer chromatography, there are obtained 60 mg. of 4-chloro-17-hexanoyloxy-7-beta-methyl-1-alpha,2-alpha-methylene-4-pregnene - 3,20-dione in the form of an oil. UV: $\epsilon_{256}=10.800$.

Example 13

2 g. of 4-chloro-17,20,20,21-bismethylenedioxy-7-beta-methyl-1-alpha,2-alphamethylene-4-pregnene - 3,11 - dione are stirred at room temperature in 300 ml. of absolute tetrahydrofuran with 4 g. of lithium-tri-(tert.-butoxy)-alanate. The reaction product is poured into acetic acid ice water after 30 hours and is extracted with methylene chloride. The methylene chloride phase is washed with water and dried. After removal of the solvent by distillation, the crude product is dissolved in 50 ml. concentrated formic acid and reacted with 10 ml. water in order to split off the protective group in the side chain. The solution is then heated for 20 minutes on a steam bath while introducing nitrogen and thereafter stirred into ice water. After extraction with methylene chloride, the organic phase is neutralized with a sodium bicarbonate solution and washed with water. After drying and removal of the solvent by distillation, an oily product is obtained consisting of 4-chloro-11-beta,17,21-trihydroxy-7-beta-methyl - 1 - alpha,2-alpha-methylene-4-pregnene-3,20-dione.

Example 14

1.2 g. 4-chloro-11-beta,17,21-trihydroxy-7-beta-methyl-1 - alpha,2 - alpha - methylene-4-pregnene-3,20-dione are acetylated at room temperature in 5 ml. pyridine with 2.5 ml. acetic acid anhydride. The reaction solution is poured into ice water after 10 hours and is further treated as described in Example 10. After chromatography with acetone/pentane through silica gel, there are obtained 530 mg. of 4-chloro-11-beta,17-dihydroxy-21-acetoxy-7-beta-methyl-1-alpha,2-alpha - methylene-4-pregnene-3,20-dione in the form of an oily product. UV: $\epsilon_{256}=10.400$.

The following examples described pharmaceutical compositions in which the compounds of the invention are employed as the effective agent.

Example 15

Gelatine capsules containing each 1 mg. of effective agent were composed as follows:

|  | Mg. |
|---|---|
| 4-chloro - 17 - acetoxy - 7 - beta - methyl-1-alpha,2-alpha-methylene-4-pregnene-3,20 - dione (particle size 2 to 8μ, individual particles up to 16μ) | 1 |
| Lactose (DAB 6—Deutsches Arzneibuch 6) | 66.5 |
| Total | 67.5 |

The components were homogenized and as customary filled into hard gelatin push-fit capsules.

Example 16

This example describes the composition of tablets containing each 5 mg. of effective agent:

|  | Mg. |
|---|---|
| 4-chloro - 17-acetoxy-7-methyl-1- alpha,2 - alpha-methylene-4,6-pregnadiene-3,20-dione | 5.000 |
| Lactose (DAB 6) | 24.000 |
| Corn starch (USP 16) | 45.065 |
| Talcum (DAB 6) | 4.000 |
| Gelatin, white (DAB 6) | 1.400 |
| Sodium laurylsulfate (USP 16) | 0.500 |
| P-Oxybenzoic acid methyl ester (DAB 6, 3. Supplement) | 0.024 |
| p-Oxybenzoic acid propyl ester (DAB 6, 3. Supplement) | 0.011 |
| | 80.000 |

The lactose, corn starch, talcum, gelatin and sodium laurylsulfate are employed as fillers. The p-oxybenzoic acid methyl ester and the p-oxybenzoic acid propyl ester are preservatives.

The tablets are made in the usual manner on a tabletting press. The tablets' specifications were as follows: diameter: 6 mm., notched; thickness: 2.6 to 2.7 mm.; hardness: about 4 kg. (Stokes hardness tester); decomposition in water at 20° C.: about 30 seconds.

Example 17

An aqueous solution for oral application was prepared as follows so that 1 ml. of the solution contained about 1 mg. of effective agent:

4-chloro - 17 - acetoxy-7-methyl-1-alpha,2-alpha-methylene-4,6-pregnadiene-3,20-dione—100 mg.
Ethyl alcohol—20 ml.
Propylene glycol—25 ml.
Add 100 ml. water, twice distilled.

Example 18

Ampoules containing an oily solution for intramuscular injection were prepared so that 1 ml. of solution contained 2 mg. of effective agent. 200 mg. of 4-chloro-17 - acetoxy-7-beta-methyl-1-alpha,2-alpha - methylene-4-pregnene-3,20-dione were dissolved in sesame oil/benzyl alcohol (at a ratio of 50 to 1) for each 100 ml. which latter amount was then filled into ampoules, each containing 1 ml., and was subjected to sterilization in the usual manner.

We claim:
1. A compound of the formula

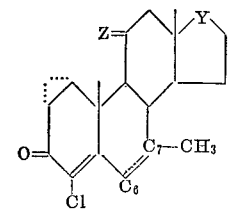

I wherein Y is

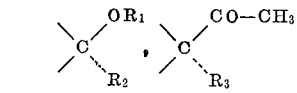

or

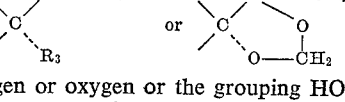

Z is hydrogen or oxygen or the grouping HOH,
$R_1$ is hydrogen or an acid residue,
$R_2$ is hydrogen or lower saturated or unsaturated alkyl,
$R_3$ is hydrogen or hydroxy or a functionally modified hydroxy group, and $C_6 = C_7$ is a saturated or unsaturated carbon-carbon bond, the 7-methyl group being beta-oriented if $C_6 = C_7$ is a saturated carbon-carbon bond.

2. The compound of claim 1, wherein the acid residue in $R_1$ is an organic carboxylic acid residue containing up to 15 carbon atoms.

3. The compound of claim 1, wherein the functionally modified hydroxyl group in $R_3$ is an ester group.

4. 4-chloro-17-acetoxy-7-beta-methyl-1-alpha,2 - alpha-methylene-4-pregnene-3,20-dione.

5. 4-chloro-17-acetoxy-7-methyl - 1 - alpha,2 - alpha-methylene-4,6-pregnadiene-3,20-dione.

6. 4-chloro-17-hydroxy-7-methyl - 1 - alpha,2 - alpha-methylene-4,6-pregnadiene-3,20-dione.

7. 4 - chloro-17-hexanoyloxy-7-methyl-1-alpha,2-alpha-methylene-4,6-pregnadiene-3,20-dione.

8. 4-chloro-17-beta-acetoxy - 7 - beta-methyl-1-alpha,2-alpha-methylene-4-androstene-3-one.

9. 4 - chloro-17-beta-hydroxy-7-beta-methyl-1-alpha,2-alpha-methylene-4-androstene-3-one.

10. 4-chloro - 17 - beta-acetoxy - 7 - methyl-1-alpha,2-alpha-methylene-4,6-androstadiene-3-one.

11. 4-chloro-17,20;20,21-bismethylenedioxy - 7 - beta-methyl-1-alpha,2-alpha-methylene-4-pregnene-3,11-dione.

12. 4 - chloro - 17,21-dihydroxy-7-beta-methyl-1-alpha,2-alpha-methylene-4-pregnene-3,11,20-trione.

13. 4 - chloro-17-hydroxy-21-acetoxy-7-beta-methyl-1-alpha,2-alpha-methylene-4-pregnene-3,11,20-trione.

14. 4-chloro-17-hydroxy - 7 - beta-methyl - 1 - alpha,2-alpha-methylene-4-pregnene-3,20-dione.

15. 4-chloro - 17 - hexanoyloxy-7-beta-methyl-1-alpha,2-alpha-methylene-4-pregnene-3,20-dione.

16. 4-chloro-11-beta,17,21 - trihydroxy-7-beta-methyl-1-alpha,2-alpha-methylene-4-pregnene-3,20-dione.

17. 4-chloro-11 - beta,17-dihydroxy-21-acetoxy-7-beta-methyl-1-alpha,2-alpha-methylene-4-pregnene-3,20-dione.

18. The process of making the compounds of claim 1, comprising the steps of bringing a steroid of the formula

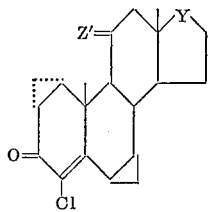

II wherein Y has the same meaning as in claim 1 and Z' is hydrogen or oxygen, into reaction with a halogen acid of the formula HX wherein X is chlorine, bromine or iodine; followed by reducing the 7-beta-halogeno methyl compound to convert the halogeno methyl group into a methyl group.

19. The process of claim 1, wherein the reaction with the halogen acid is carried out in an inert solvent.

20. The process of claim 18, wherein the halogen acid is formed in situ by reacting the starting product with an alkaline halide and a lower carboxylic acid.

21. The process of claim 18, wherein the reaction with the halogen acid is carried out at a temperature between 0 and 50° C.

22. The process of claim 18, wherein the reaction with the halogen acid is carried out at a temperature between 20 and 30° C.

23. The process of claim 18, wherein the reduction reaction is carried out at a temperature between 10 and 80° C. and over Raney-nickel as a catalyst.

24. The process of claim 18, wherein the starting product includes at least one hydroxyl group in the 17,21-position and wherein the product obtained from the reduction reaction is then subjected to esterification of the hydroxyl group.

25. The process of claim 18, wherein the starting product includes at least one ester group in the 17,21-position and wherein the product obtained from the reduction reaction is subsequently subjected to saponification by reaction with alkali followed by neutralization to convert the ester group to a hydroxyl group.

26. The product of claim 18, wherein the starting product is bismethylenedioxy-substituted in the 17,20;20,21-positions and wherein the product obtained from the reduction reaction is subsequently reacted with formic acid and alkali followed by neutralization to convert the methylene oxide groups into hydroxyl groups.

27. The process of claim 18, wherein the starting product is 11-keto-substituted and wherein the product obtained from the reduction reaction is subsequently reacted with a weak reducing agent to convert the 11-keto group to an 11-beta-hydroxyl group.

28. The process of claim 27, wherein the weak reducing agent is lithium-tri-(tert.-butoxy)-alanate.

29. The process of claim 18, wherein after formation of the 7-beta-methyl group in the reduction reaction the product is subsequently subjected to dehydrogenation to obtain a 6-7 double bond.

30. The process of claim 29, wherein the dehydrogenation is effected with bromosuccinimide, lithium halide and alkali carbonate.

References Cited
UNITED STATES PATENTS 3,466,371  9/1969  Wiecheit et al. _____ 424—240
3,480,711  11/1969  Wiecheit _____ 424—241

ELBERT L. ROBERTS, Primary Examiner

U.S. Cl. X.R.

260—397.3, 397.4, 397.45, 397.47